(12) United States Patent
Salisbury

(10) Patent No.: US 6,483,834 B1
(45) Date of Patent: Nov. 19, 2002

(54) SYSTEM FOR CREATING SWITCHED VIRTUAL CIRCUITS TO TRANSPORT INFORMATION OVER AN ATM NETWORK

(75) Inventor: Bruce Fredrick Salisbury, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 09/209,065

(22) Filed: Dec. 10, 1998

(51) Int. Cl.[7] .......................... H04L 12/24; H04L 12/28
(52) U.S. Cl. ................. 370/395.2; 370/389; 370/395.1; 370/395.3; 370/410; 370/905
(58) Field of Search ................................ 370/389, 395, 370/397, 398, 399, 410, 422, 395.1, 395.3, 395.2, 905

(56) References Cited

U.S. PATENT DOCUMENTS

| | | | | |
|---|---|---|---|---|
| 5,463,620 A | * | 10/1995 | Sriram | 370/412 |
| 5,774,453 A | * | 6/1998 | Fukano et al. | 370/231 |
| 5,894,471 A | * | 4/1999 | Miyagi et al. | 370/230 |
| 5,898,673 A | * | 4/1999 | Riggan et al. | 370/237 |
| 6,118,782 A | * | 9/2000 | Dixon et al. | 370/389 |
| 6,252,870 B1 | * | 6/2001 | Fraas et al. | 370/353 |

\* cited by examiner

*Primary Examiner*—Hassan Kizou
*Assistant Examiner*—Joe Logsdon
(74) *Attorney, Agent, or Firm*—Harley R. Ball; Steven J. Funk; Kevin D. Robb

(57) ABSTRACT

A system for creating a switched virtual circuit that includes a switch that receives initial information and a connection management system that is electrically connected to the switch, wherein the switch sends a signal to the connection management system that contains information as to the proper connection for the initial information and wherein the connection management system creates a virtual circuit that will reconfigure and transmit the initial information in such a manner that no information is lost when the initial information is transmitted by the virtual circuit.

10 Claims, 4 Drawing Sheets

FIG. 3A

| OC3 ch | TIME SLICE | CELL |
|---|---|---|
| 1 - 44 | 1 | 1 - 44 |
| 45 - 88 | 2 | 1 - 44 |
| 89 - 132 | 3 | 1 - 44 |
| 133 - 176 | 4 | 1 - 44 |
| 177 - 220 | 5 | 1 - 44 |
| 221 - 264 | 6 | 1 - 44 |
| 265 - -308 | 7 | 1 - 44 |
| 309 - 352 | 8 | 1 - 44 |
| 353 - 396 | 9 | 1 - 44 |
| 397 - 440 | 10 | 1 - 44 |
| 441 - 484 | 11 | 1 - 44 |
| 485 - 528 | 12 | 1 - 44 |
| 529 - 572 | 13 | 1 - 44 |
| 573 - 616 | 14 | 1 - 44 |
| 617 - 660 | 15 | 1 - 44 |
| 661 - 704 | 16 | 1 - 44 |
| 705 - 748 | 17 | 1 - 44 |
| 749 - 792 | 18 | 1 - 44 |
| 793 - 836 | 19 | 1 - 44 |
| 837 - 880 | 20 | 1 - 44 |
| 881 - 924 | 21 | 1 - 44 |
| 925 - 968 | 22 | 1 - 44 |
| 969 - 1012 | 23 | 1 - 44 |
| 1013 - 1056 | 24 | 1 - 44 |
| 1057 - 1100 | 25 | 1 - 44 |
| 1101 - 1144 | 26 | 1 - 44 |
| 1145 - 1188 | 27 | 1 - 44 |
| 1189 - 1232 | 28 | 1 - 44 |
| 1233 - 1276 | 29 | 1 - 44 |
| 1277 - 1320 | 30 | 1 - 44 |
| 1321 - 1364 | 31 | 1 - 44 |
| 1365 - 1408 | 32 | 1 - 44 |
| 1409 - 1452 | 33 | 1 - 44 |
| 1453 - 1496 | 34 | 1 - 44 |
| 1497 - 1540 | 35 | 1 - 44 |
| 1541 - 1584 | 36 | 1 - 44 |
| 1585 - 1628 | 37 | 1 - 44 |
| 1629 - 1672 | 38 | 1 - 44 |
| 1673 - 1716 | 39 | 1 - 44 |
| 1717 - 1760 | 40 | 1 - 44 |
| 1761 - 1804 | 41 | 1 - 44 |
| 1805 - 1848 | 42 | 1 - 44 |
| 1849 - 1892 | 43 | 1 - 44 |
| 1893 - 1936 | 44 | 1 - 44 |
| 1937 - 1980 | 45 | 1 - 44 |
| 1981 - 2024 | 46 | 1 - 44 |
| 2025 - 2068 | 47 | 1 - 44 |

FIG. 3B

| OC12 ch | TIME SLICE | CELL |
|---|---|---|
| 1 - 176 | 1 | 1 - 176 |
| 177 - 352 | 2 | 1 - 176 |
| 353 - 528 | 3 | 1 - 176 |
| 529 - 704 | 4 | 1 - 176 |
| 705 - 880 | 5 | 1 - 176 |
| 881 - 1056 | 6 | 1 - 176 |
| 1057 - 1232 | 7 | 1 - 176 |
| 1233 - 1408 | 8 | 1 - 176 |
| 1409 - 1584 | 9 | 1 - 176 |
| 1585 - 1760 | 10 | 1 - 176 |
| 1761 - 1936 | 11 | 1 - 176 |
| 1937 - 2112 | 12 | 1 - 176 |
| 2113 - 2288 | 13 | 1 - 176 |
| 2289 - 2464 | 14 | 1 - 176 |
| 2465 - 2640 | 15 | 1 - 176 |
| 2641 - 2816 | 16 | 1 - 176 |
| 2817 - 2992 | 17 | 1 - 176 |
| 2993 - 3168 | 18 | 1 - 176 |
| 3169 - 3344 | 19 | 1 - 176 |
| 3345 - 3520 | 20 | 1 - 176 |
| 3521 - 3696 | 21 | 1 - 176 |
| 3697 - 3872 | 22 | 1 - 176 |
| 3873 - 4048 | 23 | 1 - 176 |
| 4049 - 4224 | 24 | 1 - 176 |
| 4225 - 4400 | 25 | 1 - 176 |
| 4401 - 4576 | 26 | 1 - 176 |
| 4577 - 4752 | 27 | 1 - 176 |
| 4753 - 4928 | 28 | 1 - 176 |
| 4929 - 5104 | 29 | 1 - 176 |
| 5105 - 5280 | 30 | 1 - 176 |
| 5281 - 5456 | 31 | 1 - 176 |
| 5457 - 5632 | 32 | 1 - 176 |
| 5633 - 5808 | 33 | 1 - 176 |
| 5809 - 5984 | 34 | 1 - 176 |
| 5985 - 6160 | 35 | 1 - 176 |
| 6161 - 6336 | 36 | 1 - 176 |
| 6337 - 6512 | 37 | 1 - 176 |
| 6513 - 6688 | 38 | 1 - 176 |
| 6689 - 6864 | 39 | 1 - 176 |
| 6865 - 7040 | 40 | 1 - 176 |
| 7041 - 7216 | 41 | 1 - 176 |
| 7217 - 7392 | 42 | 1 - 176 |
| 7393 - 7568 | 43 | 1 - 176 |
| 7569 - 7744 | 44 | 1 - 176 |
| 7745 - 7920 | 45 | 1 - 176 |
| 7921 - 8096 | 46 | 1 - 176 |
| 8096 - 8272 | 47 | 1 - 176 |

FIG. 4

| INPUT SYSTEM | CH | OUTPUT SYSTEM | CH |
|---|---|---|---|
| OC3-1 | 1 | OC12-5 | 8000 |
| | 2 | OC12-1 | 200 |
| | 3 | OC12-4 | 475 |
| | ⋮ | | |
| | ⋮ | | |
| | 2068 | | |
| OC3-2 | 1 | OC12-5 | 7999 |
| | 2 | OC12-7 | 500 |
| | 3 | OC12-2 | 600 |
| | ⋮ | | |
| | ⋮ | | |
| | 2068 | | |
| OC3-3 | 1 | | |
| | 2 | | |
| | 3 | | |
| | ⋮ | | |
| | ⋮ | | |
| | 2068 | | |

SYSTEM FOR CREATING SWITCHED VIRTUAL CIRCUITS TO TRANSPORT INFORMATION OVER AN ATM NETWORK

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

This invention relates to a system and method for creating switched virtual circuits that will not lose time sensitive and order sensitive information during transmission.

2. Discussion of Related Art

It is known in the art that a transport network utilizing Asynchronous Transfer Mode (ATM) technology is an excellent vehicle for transferring information, via ATM cells, for a service where the arrival of the information at the terminating end is not time sensitive. For services such as voice and video, it is essential that the ATM cells arrive at the terminating end at specific times and in the proper order. One way of providing this capability is by creating switched virtual circuits between the switching entities on the ATM network. However, prior ways of creating switched virtual circuits has led to the loss of one or more cells during a transmission of cells. The loss of cells are lost in the switching fabric because of collisions when more than one cell attempts to exit on the same pipe at the same time. Since the cells are sent at random at the originating point, these collisions can occur quite frequently.

SUMMARY OF THE INVENTION

One aspect of the present invention regards a system for creating a switched virtual circuit that includes a switch that receives initial information and a connection management system that is electrically connected to the switch, wherein the switch sends a signal to the connection management system that contains information as to the proper connection for the initial information and wherein the connection management system creates a virtual circuit that will reconfigure and transmit the initial information in such a manner that no information is lost when the initial information is transmitted by the virtual circuit.

A second aspect of the present invention regards an Asynchronous Transfer Mode (ATM) network that includes a switch that receives initial information that is in the form of one or more cells of information, wherein each cell comprises n number of bytes of information and a connection management system that is electrically connected to the switch, wherein the switch sends a signal to the connection management system that contains information as to the proper connection for the initial information and wherein the connection management system creates a virtual circuit based on the total number of cells necessary to meet the transfer rate of a call transmitting the initial information.

A third aspect of the present invention regards a method for creating a switched virtual circuit for information contained within a cell received from an initial virtual connection. The method includes the steps of determining the number n bytes of information contained within the cell and defining a megaframe of time to transmit the information, wherein the megaframe has a period $T=n*p$, where p is a predetermined period of time. The method further includes the steps of determining the number of cells C contained within the initial virtual connection, channelizing the initial virtual connection into $C*n$ channels and transmitting the channelized information to a connection.

Each aspect of the present invention provides the advantage of creating a switched virtual circuit that will not only meet the arrival time and order requirements but will also insure that no cells are lost during the transmission.

Each aspect of the present invention provides the advantage of enhancing the management of an ATM network in that by assigning each cell a specific channel it is easier to know when more cells can be accepted into the network.

The foregoing features and advantages of the present invention will be further understood upon consideration of the following detailed description of the invention taken in conjunction with the accompanying drawings, in which:

BRIEF DESCRIPTION OF THE DRAWINGS

FIG. 3A shows a table which demonstrates how a SONET OC-3 connection is channelized into 2068 channels in accordance with the present invention;

FIG. 3B shows a table which demonstrates how a SONET OC-12 connection is channelized into 8272 channels in accordance with the present invention; and FIG. 4 shows a table which demonstrates a switch connection from a SONET OC-3 connection to a SONET OC-12 connection in accordance with the present invention.

DESCRIPTION OF THE PREFERRED EMBODIMENT

Figure 1:
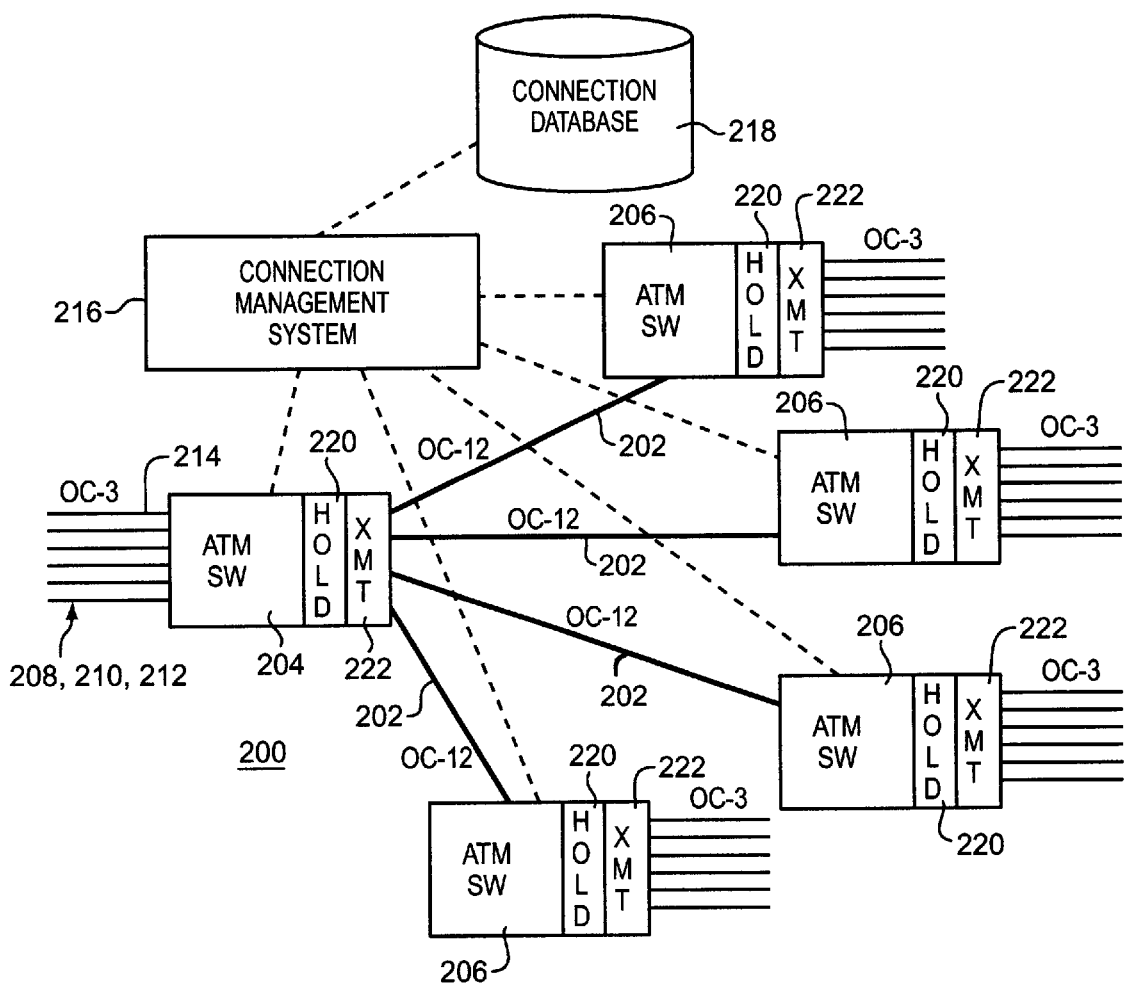
FIG. 1 schematically shows a transport network that employs the present invention.

Referring now to the drawings wherein like reference characters designate identical or corresponding parts throughout the several figures, and in particular FIG. 1 shows an Asynchronous Transfer Mode (ATM) network system 200 that is designed to create one or more virtual circuits 202. As shown in FIG. 1, the ATM network system includes one or more ATM switches 204 and 206 that initially receive asynchronous information, including such time sensitive and order sensitive information 208 such as audio information 210 and video information 212. The ATM switches 204 and 206 will be able to handle all types of cell transmission with the transmission rate an integral multiple of 64 kbps, where all traffic will become "connection oriented." The ATM switches 204 and 206 can receive the information 208 via a number of transmission technologies, such as Synchronous Optical NETwork (SONET) and Synchronous Digital Hierarchy (SDH). Preferably, the transmission technology of choice is SONET. As will be explained in more detail below, the ATM switches 204 and 206 preferably utilize buffering at their output, a SONET to tie the ATM switches together and a connection management system 216 for controlling the switch input to output connections. The transfer rates on the SONET links can vary from an OC-1 to an OC-255 or higher.

In the example shown in FIG. 1, the information 208 is initially transmitted to ATM switch 204 via a SONET OC-3 link or connection 214. The ATM switch 204 receives the information 208 in the form of one or more cells of information. It is well known in the art that each such a cell has 53 bytes of information. Five of these bytes are used for header information. The remaining 48 bytes contain the information that is being transferred. While in other applications, the cell that is used for transferring audio information 210 typically only utilizes 47 bytes while a cell for transferring video information 212 utilizes 48 bytes, the present invention requires that all the cells, irrespective of the type of information they carry, have the same number of bytes of information, such as 47 bytes. A separate out of band signaling system, such as SS7, is used to establish the initial connection before any cells are transmitted by being sent to a connection management system 216 which is electrically connected to the ATM switches 204 and 206 via Wide Area Network (WAN) which is well known in the art. During the initial connection, the path and transmission of the cells are unchanged. The connection management system 216 loads the routing buffers stored in the connections data base 218 into each of the ATM switches and creates one or more virtual circuits 202 that will reconfigure and transmit the time sensitive and order sensitive information 208 in such a manner that no information 208 is lost when the time sensitive and order sensitive information 208 is transmitted by the one or more virtual circuits 202. As the connection management system 216 creates the one or more virtual circuits 202, the connections data base 218 monitors the connection management system 216 in order to keep track of all the connections for all the created virtual circuits 202.

Figure 2:
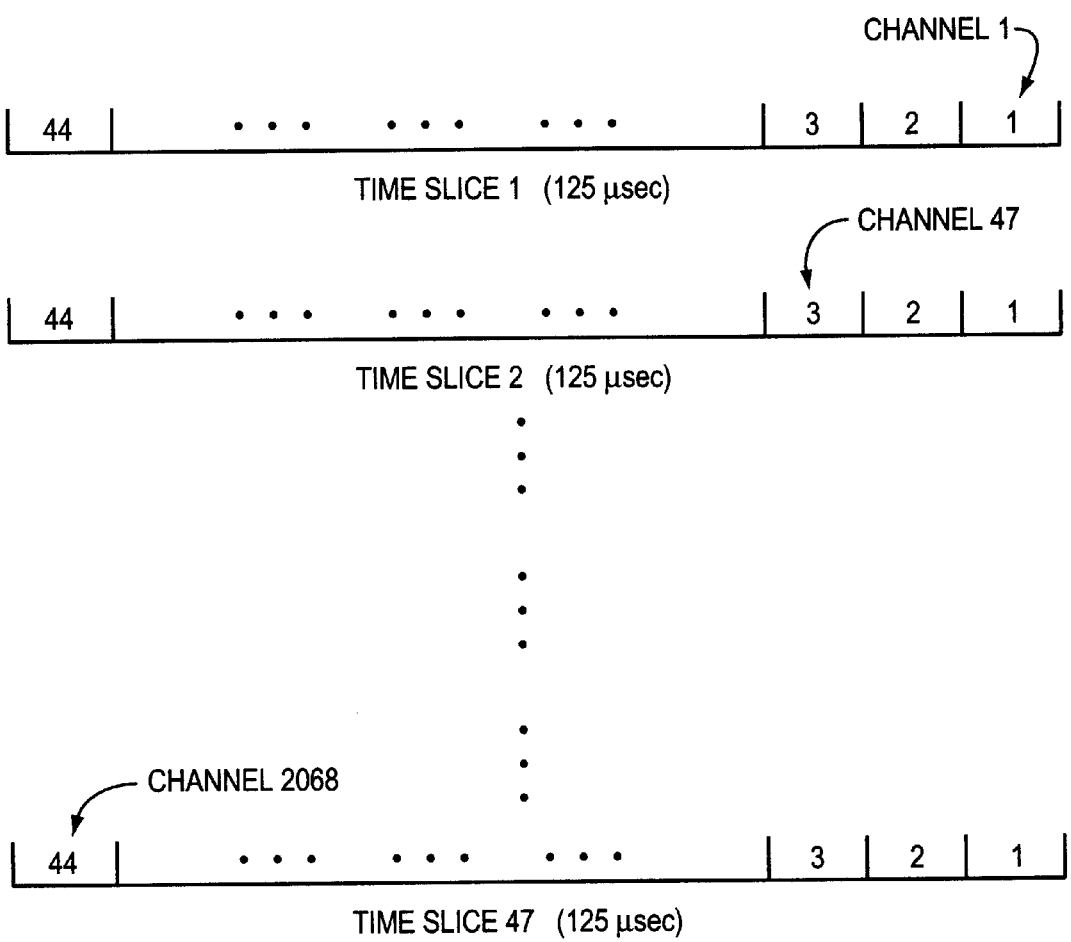
FIG. 2 schematically shows a megaframe for a SONET OC-3 connection that is formed in accordance with the present invention.

The connection management system 216 creates the one or more virtual circuits 202 by first defining a megaframe in which to transmit the time sensitive and order sensitive information 208. The megaframe is defined to span a period or unit of time $T=n*p$, where n is a constant, such as 47, that equals the number bytes of time sensitive and order sensitive information 208 contained within a cell and p is a predetermined period of time, such as 125:s. In other words, a megaframe is made of n number of time slices, each time slice having an equal time slice period of time p. Assuming that each cell contains 47 bytes of information, like voice information, and a time slice period p has a span of 125:s, then a megaframe would consist of 47 consecutive 125:s time slices resulting in the megaframe having a period T equal to 5.875 ms as shown in FIG. 2. The transmission of one cell in such a megaframe equates exactly to a transmission rate of 64 KBS.

Once the connection management system 216 has defined a megaframe, the connection management system 216 creates virtual circuits on the SONET links based on the number of cells that are available within the period T of the megaframe. Creation of the virtual circuits is accomplished by the channelization of a SONET connection. Each individual frame of a megaframe has the capacity of transmitting a finite number of cells. In the case of a frame of an OC-3 virtual connection of audio information (47 bytes), the connection contains 44 cells and the connection is channelized by the connection management system 216 so that a total of $44*47=2068$ channels are created into which the information is reconfigured. FIG. 3A illustrates the channelization of an OC-3 connection into 2068 channels. In general, the connection management system 216 identifies the number C of cells contained within a particular connection and creates $C*n$ channels, where n is the number of bytes of information within each cell. FIG. 3B illustrates the channelization of an OC-12 connection into 8272 channels ($C*n=176*47=8272$) that results in the connection management system 216 creating four times the number of channels than an OC-3 connection. Similarly, the connection management system 216 would create eight times the number of channels for an OC-24 connection when compared with an OC-3 connection.

Once the channels have been identified for a virtual connection, the next step in creating the virtual circuit is to create two buffers at the output of the ATM switch which contain a row for each of the channels previously identified. As shown in FIG. 1, each ATM switch 204 and 206 has two buffers 220 and 222 which alternatively function as a hold and transmit buffer. The initial information 208 is transmitted to the ATM switch 204 which in turn writes the incoming cells of information into the hold buffer 220 during the time period T of a megaframe. During the next time period T, the second megaframe of information 208 is read into buffer 222 and the initial megaframe of information is transmitted from buffer 220 over the SONET connection. During the third time period T, a third megaframe of information 208 is read into the buffer 220 and the second megaframe of information is transmitted from buffer 222 over the SONET connection. The above cycle where the buffers 220 and 222 alternate as hold and transmission buffers continues until all of the information is transmitted to the virtual circuits. In addition, the information 208 transmitted to the switches 206 is configured into a megaframe format, read into the hold and transmit buffers 220 and 222 and transmitted into virtual connections, such as OC-3 virtual connection, in a manner similar to the above described transmission of the original information 208 to the switch 204 and on to the OC-12 virtual connections.

Note that the cells are written into the hold buffer 222 of the ATM switches 204 and 206 based on the connection information received by the switch 204 and 206 from the connection management system 216 as a result of the connection management system 216 interpreting the header information received when the call was established. The end result is that the connection management system 216 creates the one or more virtual circuits based on the total number of cells within a megaframe that are necessary to meet the rate of the call. Furthermore, the creation of the virtual circuits will result in no loss of information 208 transmitted from switch 204 to switch 206, because the system only allows the transmission of cells that will not collide on the output SONET connection.

FIG. 4 illustrates the routing buffers in each switch. For example, the OC3-1, OC3-2 and OC3-3 are separate OC3's that terminate on the switch. In the example given in FIG. 4, the connection management system 216 has established a connection where channel 1 of OC3-1 is connected to channel 8000 of OC12, channel 2 of OC3-1 is connected to channel 200 of OC12, channel 3 of OC3-1 is connected to channel 475 of OC12, channel 1 of OC3-2 is connected to channel 7999 of OC12, channel 2 of OC3-2 is connected to channel 500 of OC12 and channel 3 of OC3-2 is connected to channel 600. As described previously, the connections data base 218 keeps track of all the connections for all the created virtual circuits 202 of FIG. 4. In addition, the OC-12 virtual connections are preferably established by an out of band signaling system.

The foregoing description is provided to illustrate the invention, and is not to be construed as a limitation. Numerous additions, substitutions and other changes can be made to the invention without departing from its scope as set forth in the appended claims.

I claim:

1. A system for creating a switched virtual circuit, the system comprising:

a switch that receives initial information; and a connection management system that is electrically connected to said switch, wherein said switch sends a signal to said connection management system that contains information as to the proper connection for said initial information and wherein said connection management system creates a virtual circuit that will reconfigure and transmit said initial information in such a manner that no information is lost when said initial information is transmitted by said virtual circuit;

wherein said switch and said connection management system form part of an Asynchronous Transfer Mode network and said initial information is in the form of one or more cells of information, wherein each cell contains n number of bytes of information to be reconfigured by said connection management system;

wherein said connection management system creates said virtual circuit based on reconfiguring said n bytes of information in said one or more cells into a megaframe that comprises n number of equally long time slices.

2. The system for creating a virtual circuit of claim 1, wherein said initial information comprises time sensitive and order sensitive information.

3. The system for creating a virtual circuit of claim 2, wherein said time sensitive and order sensitive information comprises audio information.

4. The system for creating a virtual circuit of claim 2, wherein said time sensitive and order sensitive information comprises video information.

5. The system for creating a virtual circuit of claim 3, wherein said time sensitive and order sensitive information comprises video information.

6. The system for creating a virtual circuit of claim 1, wherein said virtual circuit transmits said reconfigured information to a second switch.

7. The system for creating a virtual circuit of claim 1, wherein said switch comprises a first buffer to receive and hold said reconfigured information.

8. The system for creating a virtual circuit of claim 7, wherein said switch comprises a second buffer to receive and hold said reconfigured information from said first buffer until said first buffer receives second reconfigured information.

9. The system for creating a virtual circuit of claim 1, wherein each of said n number of time slices has a time slice period of 125:s.

10. The system for creating a virtual circuit of claim 1, wherein said connection management system creates said virtual circuit based on the total number of cells within the megaframe necessary to meet the transfer rate of a call transmitting said initial information.

* * * * *